United States Patent
Hammarwall et al.

(10) Patent No.: US 9,614,593 B2
(45) Date of Patent: Apr. 4, 2017

(54) COMPENSATION FOR PROPAGATION DELAY IN A WIRELESS COMMUNICATION SYSTEM

(75) Inventors: David Hammarwall, Stockholm (SE); George Jongren, Stockholm (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 1879 days.

(21) Appl. No.: 12/988,671

(22) PCT Filed: Feb. 27, 2009

(86) PCT No.: PCT/SE2009/050223
§ 371 (c)(1),
(2), (4) Date: Oct. 20, 2010

(87) PCT Pub. No.: WO2009/131521
PCT Pub. Date: Oct. 29, 2009

(65) Prior Publication Data
US 2011/0039497 A1 Feb. 17, 2011

(30) Foreign Application Priority Data

Apr. 25, 2008 (EP) ..................... 08155230
Apr. 30, 2008 (EP) ..................... 08155457

(51) Int. Cl.
*H04B 1/06* (2006.01)
*H04B 7/00* (2006.01)
(Continued)

(52) U.S. Cl.
CPC ............... *H04B 7/04* (2013.01); *H01Q 1/246* (2013.01); *H01Q 3/2682* (2013.01); *H04B 17/364* (2015.01)

(58) Field of Classification Search
USPC .. 455/504–506, 522, 523, 65, 67.16, 68, 69, 455/242.1–244.1, 231, 276.1
See application file for complete search history.

(56) References Cited

U.S. PATENT DOCUMENTS 5,613,219 A * 3/1997 Vogel ................... H04B 7/0671
342/368
5,689,502 A * 11/1997 Scott ..................... H04J 3/0682
370/281
(Continued)

FOREIGN PATENT DOCUMENTS

CN 1272268 A 11/2000
CN 1452425 A 10/2003
(Continued)

*Primary Examiner* — Edward Urban
*Assistant Examiner* — Rui Hu
(74) *Attorney, Agent, or Firm* — Patent Portfolio Builders, PLLC

(57) ABSTRACT

In a first aspect the present invention relates to a method of compensating for propagation delay in a wireless communication system. A first base station is in communication with a first plurality of antenna units which are adapted to be in wireless communication with a first terminal. The first terminal having a terminal antenna. The first plurality of antenna units is spatially separated. The method according to the first aspect comprises the steps of determining relative propagation delay from each of the first plurality of antenna units to the terminal antenna and using the determined propagation delay to establish a delay profile to compensate for propagation delay from each of the antenna units to the first terminal and applying the delay profile to a transmission between the base station and the terminal. In a second aspect the present invention further relates to a system implementing the method according to the first aspect.

25 Claims, 3 Drawing Sheets

(51) Int. Cl.
*H04B 7/04* (2017.01)
*H01Q 1/24* (2006.01)
*H01Q 3/26* (2006.01)
*H04B 17/364* (2015.01)

(56) References Cited

U.S. PATENT DOCUMENTS

| | | | | |
|---|---|---|---|---|
| 5,805,983 A * | 9/1998 | Naidu | ............... | H04B 7/0894 455/503 |
| 5,974,057 A * | 10/1999 | Rozanski, Jr. | ....... | H04B 17/364 370/519 |
| 6,061,553 A * | 5/2000 | Matsuoka | ............ | H01Q 3/2605 455/273 |
| 6,628,959 B1 * | 9/2003 | Hiramatsu | .......... | H04W 52/283 455/522 |
| 6,721,367 B1 * | 4/2004 | Miya | .................... | H04B 7/0615 375/267 |
| 6,832,079 B2 * | 12/2004 | Arima | ................. | H04B 1/7113 370/342 |
| 6,895,230 B1 * | 5/2005 | Blount | ................... | H04B 7/084 342/174 |
| 6,895,253 B1 * | 5/2005 | Carloni | ................. | H01Q 1/007 455/25 |
| 6,970,686 B2 * | 11/2005 | Mizoguchi | .......... | H04B 7/0842 375/267 |
| 7,155,231 B2 * | 12/2006 | Burke | .................. | H04B 7/0617 342/423 |
| 7,174,139 B2 * | 2/2007 | Lipka | .................. | H04B 7/0671 375/345 |
| 7,650,261 B2 * | 1/2010 | Takiishi | ............... | H04B 17/391 333/142 |
| 7,957,700 B2 * | 6/2011 | Leukkunen | .......... | H04B 7/0671 455/114.2 |
| 8,249,514 B2 * | 8/2012 | Kashiwase | ............ | H04B 7/005 370/310 |
| 2003/0153360 A1 * | 8/2003 | Burke | .................. | H04B 7/0626 455/562.1 |
| 2003/0228887 A1 | 12/2003 | Kishigami et al. | | |
| 2004/0087294 A1 * | 5/2004 | Wang | .................... | H04B 7/086 455/276.1 |
| 2004/0105382 A1 | 6/2004 | Miyoshi et al. | | |
| 2005/0101244 A1 * | 5/2005 | Lipka | .................. | H04B 7/0671 455/1 |
| 2008/0075210 A1 | 3/2008 | Mudulodu et al. | | |
| 2009/0135940 A1 * | 5/2009 | Imamura | .............. | H04B 7/0689 375/267 |
| 2010/0190456 A1 * | 7/2010 | Asplund | ................ | H04B 17/12 455/106 |
| 2010/0233966 A1 * | 9/2010 | Kashiwase | ............ | H04B 7/005 455/67.11 |
| 2011/0003608 A1 * | 1/2011 | Forenza | .................. | H04B 7/01 455/501 |
| 2012/0099522 A1 * | 4/2012 | Kawasaki | ............ | H04W 48/20 370/328 |

FOREIGN PATENT DOCUMENTS

| | | |
|---|---|---|
| CN | 101103573 A | 1/2008 |
| EP | 1361678 A2 | 11/2003 |
| EP | 1507350 A1 | 2/2005 |
| EP | 1845645 A1 | 10/2007 |
| WO | 99/17481 | 4/1999 |

* cited by examiner

COMPENSATION FOR PROPAGATION DELAY IN A WIRELESS COMMUNICATION SYSTEM

TECHNICAL FIELD

The present invention relates to a method of compensating for propagation delay in a wireless communication system. The present invention further relates to a wireless communication system wherein propagation delay is compensated for.

BACKGROUND

It is well-known that the use of multiple antennas at the transmitter and/or the receiver can significantly boost the performance of a wireless system. Such multiple-input-multiple-output (MIMO) antenna configurations have the potential of both improving data rates as well as increasing the diversity.

Precoding is a popular multi-antenna technique for improving the performance of a MIMO system by transforming the information carrying transmit vector so that it better fits the channel conditions. This can be done based on instantaneous channel information or completely without channel information or some combination thereof. Often, precoding is implemented as performing a linear transformation on the information carrying vector prior to transmission. Such linear transformation is usually represented by a matrix. Precoding is an integral part of LTE, Long Term Evolution, as well of WCDMA, Wideband Code Division Multiple Access.

There are two basic flavors or types of precoding—codebook based and non-codebook based. Codebook based precoding means that the precoding matrix implementing the linear transformation is selected from a countable and typically finite set of candidate matrices. The mentioned set constitutes the codebook. Channel dependent codebook based precoding can be seen as a form of channel quantization since typically a set of channel realizations map to a certain precoding element. Non-codebook based precoding, on the other hand, does not involve any quantization, the precoding element can thus for example be a continuous function of the channel matrix.

Beamforming is a special case of the more general notion of precoding where a single information carrying symbol stream is multiplied by a channel dependent vector that adjusts the phase of the signal on each transmit antenna so that coherent addition of the transmit signals is obtained at the receiver side. This provides diversity as well as increases the signal-to-noise-ratio, SNR.

The precoder element to use may need to be signaled by means of feedback signaling and/or signaling of chosen precoder element in forward link. The feedback signaling can be viewed as a way for the receiver to provide channel information to the transmitter.

Several different approaches are common for forward link signaling. Explicitly signaling the precoder element index in forward link is possible. It is also possible to signal it implicitly using precoded pilots/reference symbols, RS, that together with non-precoded reference symbols can be used at the receiver to determine the used precoder element. Another possibility is to use precoded reference symbols also for the demodulation of the data, so-called dedicated RS, and from the receiver's point of view it will absorb the precoder element into the effective channel.

For maximum performance, the precoding element should be chosen to match the effective channel including transmit and receive filters, channel responses of antenna cables and of course the actual propagation channel. If the effective channel varies over the bandwidth allocated to communication, then there is a need to adapt the precoding over frequency as well to get the best possible match with the frequency-selective channel. Naturally, this affects the signaling of precoder elements so that a finer frequency granularity of the feedback and forward link signaling may be needed. If dedicated RS is used, it reduces the coherence bandwidth of the effective channel, which means that channel estimation procedures at the receiver side may have less data to average over and thus negatively affect the estimation accuracy.

SUMMARY

The present specification refers to a fixed antenna installation that is localized to a small area as an Antenna Unit, which comprises one or multiple antennas. Several antenna units can be connected to a Joint Processing Unit (JPU) using high capacity links with low delay. The JPU performs the base band processing for all connected antenna units jointly, such that potentially several connected antenna units are simultaneously used to coherently receive and transmit signals.

A JPU with one or several connected antenna units can for example be implemented in the following ways:
  as a single NodeB serving a single cell,
  as a single NodeB serving multiple cells,
  as multiple connected NodeBs serving multiple cells In the present context downlink is understood as the JPU/antenna units being the transmitters and terminals being the receivers.

As already mentioned channel dependent precoding has the potential of providing significant performance gains. Achieving those gains, however, relies on the ability for the precoder element to sufficiently closely match the channel. Effective channels which are frequency-selective present, in this respect, a problem since they require the used precoder element to track the channel as it varies over frequency. For codebook based precoding this typically implies a significantly higher signaling overhead, since the appropriate precoder elements need to be signaled from the receiver and/or signaled from the transmitter to the receiver. The needed amount of dedicated reference symbols, RS, may increase, thus also contribute to higher signaling overhead. An alternative view could be if the signaling overhead is kept constant, then the degree of mobility at which efficient support of precoding can be achieved becomes more limited. Consequently, the precoding needs to be carried out with smaller frequency granularity resulting in higher overhead to obtain the same performance, or with fixed overhead, being able to support precoding at lower terminal speeds. Note that also for non-codebook based precoding may increased frequency selectivity incur additional overhead.

High frequency selectivity also results in channel estimation degradation because the estimation is then forced to be limited in frequency, which reduces the potential of frequency interpolation in the channel estimation.

The characteristics of effective channels may be separated in three, more or less independent, parts:
1. Microscopic Propagation-Channel Characteristics: This part consists of the changes caused by small/localized perturbations in the radio environment. These perturbations result in rapid changes in the propagation channel.

2. Macroscopic Propagation-Channel Characteristics: This part consists of the large-scale parameters in the propagation channel; such as propagation delays, angle of arrivals, path loss and so on. In general these parameters affect the statistical distribution of the propagation channel and change relatively slowly.

3. Hardware Induced Characteristics: This part includes the effects introduced by the hardware such as the radio chains at the antenna units including transmit filters and the cables connecting the antennas to the JPU.

The microscopic propagation channel part of the effective channel has fast time-variations and can be challenging to compensate for without incurring additional significant signaling overhead.

However, the other parts of the effective channel are relatively constant over time and may be easier to take into account. The hardware induced characteristics of the effective channel, imposed by the antenna units and the links to the JPU, are mutual to all terminals, and may be compensated for using for example the approach of using the terminals to perform measurements on the hardware induced timing misalignment of the different antennas of a specific antenna unit and thereafter to signal a measurement report back to the JPU.

Traditionally the antennas connected to a JPU have been localized to a single site, in the form of a NodeB, and the frequency selectivity introduced by macroscopic timing delays have not been an issue, because the propagation-delay differences from the NodeB's antennas to a terminal have been small. However, with the anticipated distributed antenna systems, DAS, with remote antenna units, which may be widely separated, the propagation delay from the different antenna units to a specific terminal may vary significantly, which causes strong frequency selectivity in the effective channel. If the macroscopic propagation delays are not compensated for in these scenarios, codebook based precoding introduces additional losses due to the individual precoder elements being ill-matched to the channel.

The above problems and disadvantages are overcome in a first aspect of the present invention by a method of compensating for propagation delay in a wireless communication system. A first processing unit is in communication with a first plurality of antenna units which is in wireless communication with a first terminal. The first terminal having a terminal antenna. The first plurality of antenna units is spatially separated. The method according to the first aspect comprises the steps of determining relative propagation delay from each of the first plurality of antenna units to the terminal antenna, and using the determined propagation delay to establish a delay profile to compensate for propagation delay from each of the antenna units to the first terminal and applying the delay profile to a transmission between the processing unit and the terminal.

The method according to the present invention provides compensation for propagation delay differences that occur in distributed antenna systems. A significant benefit of this is that significantly fewer precoding elements may be needed to efficiently match the channel over the whole bandwidth. This is contemplated to translate into substantial reduction of signaling overhead. In some cases precoding may not even be possible without proper compensation. Contrary to previous compensation methods, the method according to the present invention introduces compensation profiles that are specific for each targeted terminal. A terminal specific profile is contemplated to allow compensation of the virtual frequency selectivity introduced by the macroscopic propagation channel characteristics, which are terminal specific, of DAS. The scheme is transparent for the terminals and may in some embodiments not even require any processing by the terminals.

The method according to the present invention may be used for a transmission from the processing unit to the terminal or from the terminal to the processing unit alike.

In further advantageous embodiments of the present invention the processing unit may be a base station or a Node B. The processing unit in the present context is a unit connected to a number of antenna units and a communication network, such as a wired network, e.g. an SDH/SONET network or any other type of communication network. The processing unit establishes communication from the communication network to one or more wireless terminals, e.g. mobile phones. The actual choice of processing unit may depend on the type of wireless network being established.

The term "terminal" is in the present context used for any kind of device capable of establishing wireless communication with a processing unit. Examples of such terminals include mobile phones, modem devices for computers, PDA's and other electronic devices, e.g. media centers and the like.

In an embodiment of the present invention one of the first plurality of antenna units may comprise a multitude of antennas. Further embodiments of the present invention may include more than one of the first plurality of antenna units comprising a multitude of antennas. The multiple antennas may be e.g. used for beam-forming of the signal from the antenna unit. Also, the multiple antennas may be used for supporting communication with more terminals.

In specific embodiments at least two of the first plurality of antenna units may comprise the same number of antennas or, in the alternative, each of the first plurality of antenna units may comprise different numbers of antennas.

The terminal may comprise a second plurality of antennas. A terminal may comprise more than one antenna, e.g. for establishing a higher data transfer rate.

Advantageously the first processing unit may be in communication with a third plurality of terminals. It is contemplated that the more terminals a given processing unit supports a better utilization of the processing unit capacity is achieved.

The method according to the present invention may be performed in frequency domain. The method according to the present invention may then further comprise the steps of the relative propagation delay between each of the first plurality of antenna units and the terminal or each of the second plurality of terminals being determined in the frequency domain and the still further following steps of evaluating phase differences between propagation channels between the terminal and multiple antenna units for two different frequencies and further estimating propagation time differences from the slope of one line being fitted to the evaluated phase differences over frequency. Also, advantageously phase differences may be evaluated for a fourth plurality of frequencies.

In one embodiment of the present invention each propagation time difference may be estimated from a fifth plurality of fitted lines with one or a sixth plurality of slopes. The calculations are preferably carried out in the processing unit.

The result of the calculations, i.e. the delay profile, may be transmitted to the terminal wherein the delay profile may be applied to transmissions from the terminal to the processing unit via the antenna units.

In a particular advantageous embodiment of the present invention the propagation delay between each of the first plurality of antenna units and the terminal or each of the second plurality of terminals may be determined using the equation:

$$\Theta_{kl}^{(m,n)}(f) - \Theta_{k'l}^{(m',n)}(f) = \phi_{kl}^{(m,n)}(f) - \phi_{k'l}^{(m',n)}(f) + \Delta_{mm'}^{(n)} f,$$

wherein $\Delta_{mm'}^{(n)} = \tau^{(m,n)} - \tau^{(m',n)}$ is an estimate of the time difference between signals from the n'th terminal arriving at antenna units m and m' of the first plurality of antenna units, $\tau^{(m,n)}$ is the time difference induced by the propagation channel between the processing unit and the second plurality of antennas of terminal n, $\Theta_{kl}^{(m,n)}(f) - \Theta_{k'l}^{(m',n)}(f)$ is an estimate of phase difference of two channels, and $\phi_{kl}^{(m,n)}(f) - \phi_{k'l}^{(m',n)}(f)$ is the microscopic phase difference.

The term $\Delta$ may further be approximated by the term:

$$\hat{\Delta}_{mm'}^{(n)} = \underset{\Delta}{\operatorname{argmin}} \sum_{m=1}^{M} \min_{x_m} \sum_{f \in \aleph_m} \left( \left[ (\Theta_{kl}^{(m,n)}(f) - \Theta_{k'l}^{(m',n)}(f)) - (x_m + \Delta \cdot f) \right]_{\pm \pi} \right)^2$$

This is contemplated to reduce the complexity of the calculations without loosing too much precision.

Further embodiments of the present invention comprise applying the delay profile in frequency domain by de-rotating phase of the transmitted signal from the antenna units. Alternatively, the delay profile may be applied in time domain. The specific implementation of the method may be based on the properties of the underlying system wherein the method is implemented. As an example in OFDM systems the frequency domain solution is preferred.

In presently preferred embodiments of the present invention the terminal does not have to perform any measurement, signaling or calculation regarding the delay profile.

In still further embodiments the delay profile may be applied as a pure time shift or in the alternative as a cyclic time shift.

A second aspect of the present invention relates to an apparatus adapted to be connected to a communication link for establishing communication to a plurality of antenna units. The apparatus further comprises a controller unit and a storage unit comprising a software implementation of a method of compensating for propagation delay in the wireless communication system. The plurality of antenna units is adapted to be in wireless communication with a first terminal having a terminal antenna. The first plurality of antenna units is spatially separated. The method comprises the steps of determining propagation delay from each of the first plurality of antenna units to the terminal antenna, using the determined propagation delay to establish a delay profile to compensate for propagation delay from each of the antenna units to the first terminal and applying the delay profile to a transmission between the processing unit and the terminal.

The apparatus according to the second aspect may include software implementation comprising any of the features mentioned in relation to the first aspect of the present invention.

BRIEF DESCRIPTION OF THE DRAWINGS

The present invention will now be discussed in more detail with reference to the appended illustrations wherein.

DETAILED DESCRIPTION

Figure 1:
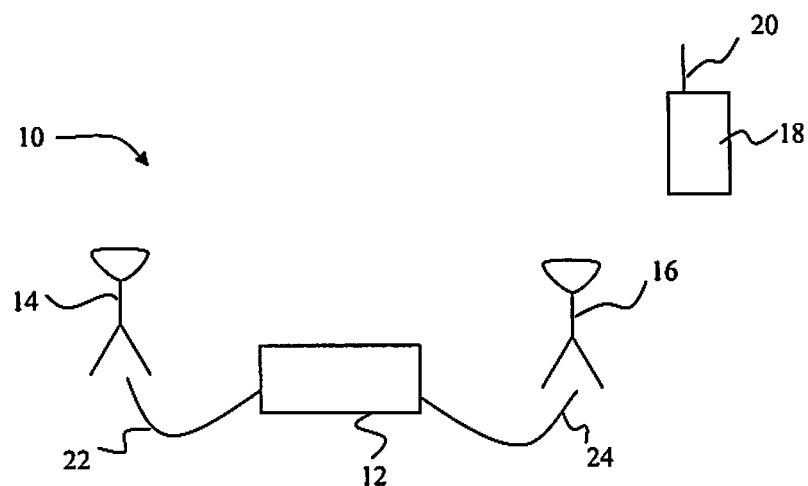
FIG. 1 is a schematic illustration of a wireless communication system.

FIG. 1 is a schematic illustration of communication system 10. In the system 10 a base station 12 communicates via antenna units 14 and 16 with a terminal 18. The terminal 18 is illustrated as a mobile phone, but could have several other forms, e.g. modem for a computer, e.g. a laptop, or it could be a communication device in a personal data assistant, a PDA. Other embodiments of the terminal device may also be envisioned. The terminal 18 comprises a terminal antenna 20.

The antenna units 14 and 16 are positioned at different locations, meaning that they are spatially separated.

The base station 12 is connected to the antenna units 14 and 16 via high speed data links illustrated by the lines 22 and 24. The data links are established using optical fiber cables. In alternative embodiments the data links 22 and 24 may be established using other techniques, such as high speed wireless microwave links or high speed wired links.

As the transmission of electromagnetic waves between the terminal 18 and the antenna units 14 and 16 is limited by the laws of nature, signals from the antenna unit 14 will probably arrive at a different time than signals from antenna unit 16. Therefore the delay needs to be compensated for.

A method of compensating for propagation delay according to the present invention comprises determining relative propagation delay from each of the antenna units 14 and 16 to the terminal antenna 20. Hereafter the determined propagation delay is used to establish a delay profile to compensate for propagation delay from each of the antenna units 14 and 16 to the terminal 18 or the terminal antenna 20. The delay profile is applied to one or more transmissions between the base station 12 and the terminal 18. Depending on how often the measurement is performed, the same delay profile may be used multiple times. If the terminal 18 is moved relatively fast, e.g. in a car, bus or train, the measurement may be performed more often. The delay profile may be applied to transmissions from the terminal 18 to the base station 12, as well as to transmissions from the base station 12 to the terminal 18.

The invention provides a means to compensate for the virtual frequency selectivity introduced when the length of the radio wave traversal paths of different antenna units to the terminals are different.

The procedure may be divided into two parts, i.e. the propagation delay estimation part and the channel compensation part.

To estimate the propagation delays the reciprocity of the macroscopic propagation channel characteristics is utilized. The JPU performs a measurement on the reverse link, i.e. the uplink. Consider the time differences experienced by user n. One possible way for the JPU to estimate the propagation time differences to antenna units m and m' is the following. The JPU first estimates the effective channel as a function of frequency over some bandwidth. Let the phase of the channel estimate from the nth terminal's antenna l to mth antenna units antenna k be denoted by $\Theta_{kl}^{(m,n)}(f)$.

This quantity can be written as $\Theta_{kl}^{(m,n)}(f) = \phi_{kl}^{(m,n)}(f) + \tau^{(m,n)} f$, where the first term targets describes the phase variations due to the microscopic propagation channel characteristics, while the second term primarily deals with the macroscopic propagation delays, as described by $\tau^{(m,n)}$, which denotes the time difference induced by the propagation channel between antenna unit m and terminal n.

The JPU can now estimate the time difference $\Delta_{mm'}^{(n)} = \tau^{(m,n)} - \tau^{(m',n)}$ of the signals arriving at antenna units m and m' by first forming the difference $$\Theta_{kl}^{(m,n)}(f) - \Theta_{k'l}^{(m',n)}(f) = \phi_{kl}^{(m,n)}(f) - \phi_{k'l}^{(m',n)}(f) + \Delta_{mm'}^{(n)} f$$

then fitting a line to this data, possibly taking the modulo $2\pi$ arithmetic into account. The slope of the line is an estimate of the time difference.

Note however that $\phi_{kl}^{(m,n)}(f)$ and $\phi_{k'l}^{(m',n)}(f)$ generally vary independently over the frequency band, because they belong to different antenna units. Therefore traditional line fitting can only be applied over a frequency interval in which the microscopic phase difference, $\phi_{kl}^{(m,n)}(f) - \phi_{k'l}^{(m',n)}(f)$, remains essentially constant. One way to utilize the information provided by the entire frequency band, is to divide the band into M frequency intervals that are each sufficiently narrow for $\phi_{kl}^{(m,n)}(f) - \phi_{k'l}^{(m',n)}(f)$ to remain essentially constant. Let $N_m$ denote the set of frequency bins allocated to the mth interval. In this interval, the phase difference thus satisfies $$\Theta_{kl}^{(m,n)}(f) - \Theta_{k'l}^{(m',n)}(f) \approx x_m + \Delta \cdot f, f \in N_m,$$

for some constant $x_m$, which contrary to $\Delta$ is specific to the interval. It is thus possible to estimate $\Delta$ jointly from all these intervals by approximating $\Theta_{kl}^{(m,n)}(f) - \Theta_{k'l}^{(m',n)}(f)$ as piecewise affine (where all lines have the same slope). By fitting multiple lines (one for each interval) with the same slope to $\Theta_{kl}^{(m,n)}(f) - \Theta_{k'l}^{(m',n)}(f)$ the time difference can be estimated as $$\hat{\Delta}_{mm'}^{(n)} = \underset{\Delta}{\operatorname{argmin}} \sum_{m=1}^{M} \min_{x_m} \sum_{f \in \aleph_m} \left( \left[ \left( \Theta_{kl}^{(m,n)}(f) - \Theta_{k'l}^{(m',n)}(f) \right) - (x_m + \Delta \cdot f) \right]_{\pm \pi} \right)^2,$$

where [•] denotes the modulo $2\pi$ operator that maps to the interval $[-\pi, \pi]$.

This process may be repeated for any combination of terminal antenna l and antenna unit antennas k, k' and also over multiple samples in time and the results may finally be averaged to improve the estimate. By utilizing that the uplink and downlink delay profiles are highly related the JPU may use the uplink measurement to compensate the downlink transmission or transmissions.

An alternative to the above optimization is to perform a more explicit phase unwrapping and then fit a single line to the end points of the unwrapped phase as seen over the entire system bandwidth.

The above exemplified estimation procedure may be combined with other coarser estimation schemes as well, including time-domain correlation based methods.

Based on the estimated time differences, $\Delta_{mm'}^{(1)}$, $\Delta_{mm'}^{(2)}$ . . . , it is straightforward for the JPU to compensate for it in the downlink transmission to the users by de-rotating the phase in the frequency domain; the first users signal is compensated based on $\Delta_{mm'}^{(1)}$, the second user on $\Delta_{mm'}^{(2)}$ and so on. Shifting in the time domain is also possible, a pure time shift or possible a cyclic time shift. Ideally, with the compensation the effective channel to the terminals of distributed antenna systems will have similar frequency selectivity behavior as traditional single site NodeB's.

Figure 2:
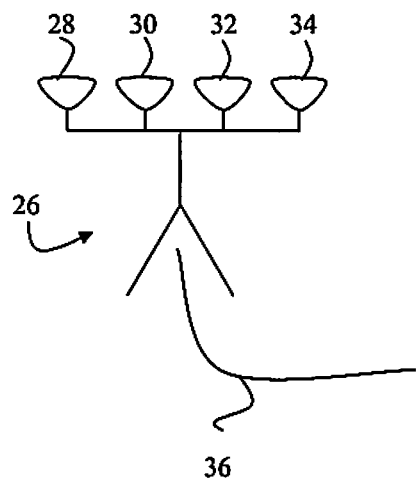
FIG. 2 is a schematic illustration of an antenna unit.

FIG. 2 is a schematic illustration of an antenna unit 26 comprising four antennas 28, 30, 32 and 34. The multiple antennas 28, 30, 32 and 34 may be used for supporting further terminals and/or beamforming of a signal from the antenna unit. The antenna unit 26 may establish communication with a processing unit via a communication link 36.

Figure 3:
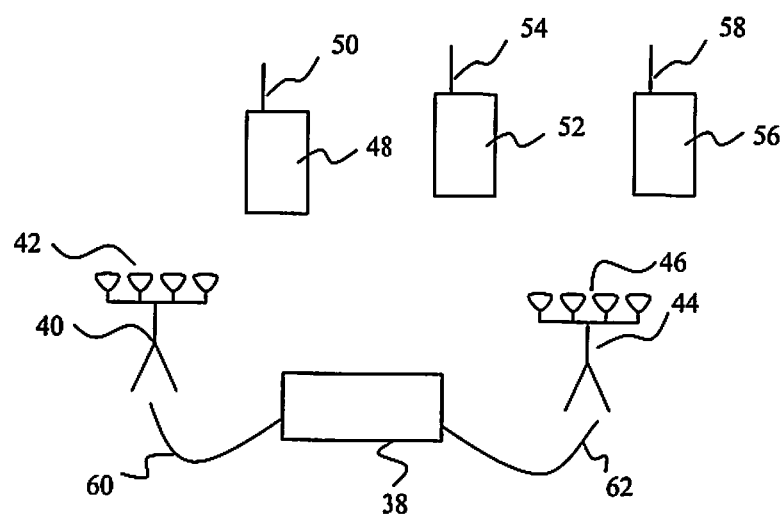
FIG. 3 is a schematic illustration of an alternative wireless communication system,
FIG. 4 a schematic illustration of a further alternative wireless communication system.

FIG. 3 is a schematic illustration of an alternative wireless communication system where a base station 38 is in communication with antenna units 40 and 44 via communication links 60 and 62. The antenna units 40 and 44 each comprise four antennas 42 and 46 respectively.

Wireless communication is established to three terminals 48, 52 and 56. Each of the terminals comprises a terminal antenna 50, 54 and 58. The terminal antenna 50, 54 and 58 may be constituted by a terminal antenna comprising one or more antennas.

Figure 4:
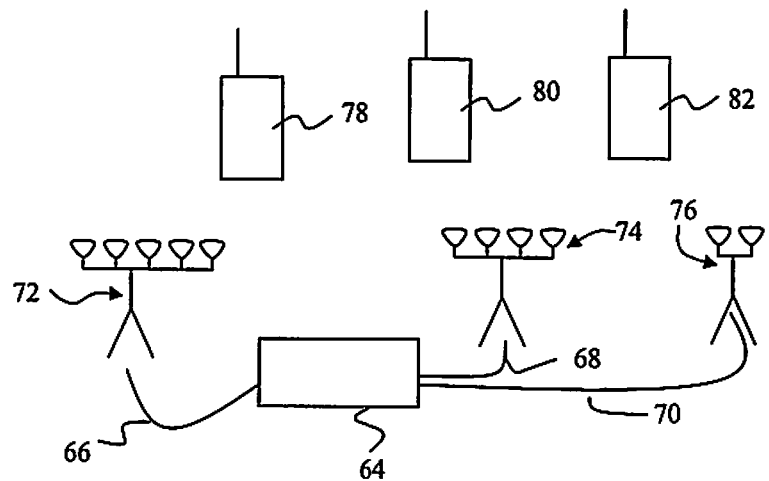

FIG. 4 is a schematic illustration of a further alternative wireless communication system where a processing unit or base station 64 via antenna units 72, 74 and 76 has established wireless communication to terminals 78, 80 and 82.

In the embodiment shown in FIG. 4 the antenna units 72, 74 and 76 comprise different numbers of antennas.

The base station 64 is connected to the antenna units 72, 74 and 76 via communication links 66, 68 and 70. As with the above embodiments the links 66, 68 and 70 may be constituted by high speed optical or electrical links. In alternative embodiments the links 66, 68 and 70 may be constituted by wireless links, such as microwave links or the like.

Figure 5:
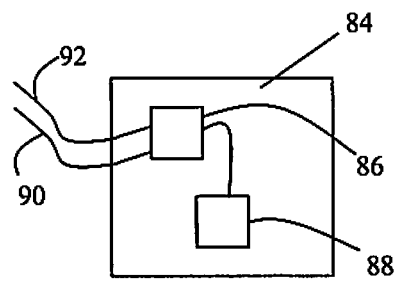
FIG. 5 is a schematic illustration of a processing unit.

FIG. 5 schematically illustrates a processing unit 84. The processing unit 84 may constitute any of the processing units 12, 38 or 64. The processing unit may be incorporated into or constitute a base station or NodeB. The processing unit 84 includes a controller 86 and a memory unit 88. The memory unit is adapted to store a computer implementation of the method according to the present invention. The processor is adapted to carrying out the steps of the method according to the present invention. The processing unit 84 includes connectors 90 and 92 for communicating with external devices and apparatuses, such as antenna units.

Figure 6:
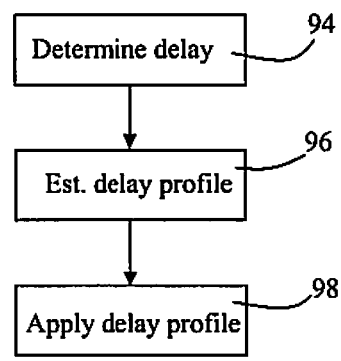
FIG. 6 is a schematic illustration of three steps of the method according to the present invention.

FIG. 6 schematically illustrates steps of the method according to the present invention. The method of compensating for propagation delay according to the present invention comprises the steps of determining 94 relative propagation delay from each of the antenna units 14 and 16 to the terminal antenna 20. Hereafter the determined propagation delay is used to establish a delay profile 96 to compensate for propagation delay from each of the antenna units 14 and 16 to the terminal 18 or the terminal antenna 20. The delay profile is applied 98 to one or more transmissions between the base station 12 and the terminal 18. As discusses in relation to FIG. 1, depending on how often the measurement is performed, the same delay profile may be used multiple times.

The specific embodiments described above are merely given as examples, and it should be understood that at the present invention is not limited thereto. Further modifications, changes and improvements that retain the basic underlying principles disclosed and claimed herein are to be considered within the scope of the invention.

The invention claimed is:

1. A method of compensating for propagation delay in a wireless communication system, wherein a processing unit in a base station or in a NodeB is in communication with a first plurality of antenna units being in wireless communication with at least a first terminal, the first terminal having a terminal antenna, the method comprising:

determining relative propagation delay associated with a wireless channel from each of the first plurality of antenna units to the terminal antenna of said first terminal, the first plurality of antenna units being part of a distributed antenna system such that the first plurality of antenna units are spatially separated from each other and from the base station or the NodeB;

establishing a delay profile specific for the first terminal using the determined relative propagation delays; and compensating for the determined relative propagation delay from each of the first plurality of antenna unit to said first terminal by applying the delay profile to a transmission between the processing unit and said first terminal, wherein the relative propagation delay between each of the first plurality of antenna units and said first terminal or between each of the first plurality of antenna units and each of a second plurality of terminals are determined in the frequency domain, wherein the method further comprises:

evaluating phase differences between propagation channels between said first terminal and the first plurality of antenna units, or between a terminal in the second plurality of terminals and the first plurality of antenna units, for two different frequencies;

estimating propagation time differences from the slope of one line being fitted to the evaluated phase differences over frequency.

2. The method according to claim 1, wherein the transmission is from the processing unit to said first terminal or from said first terminal to the processing unit.

3. The method according to claim 1, wherein one of the first plurality of antenna units uses a multitude of antennas.

4. The method according to claim 1, wherein said first terminal uses a plurality of antennas.

5. The method according to claim 1, wherein the processing unit is in communication with a third plurality of terminals.

6. The method according to claim 1, wherein the phase differences are evaluated for a fourth plurality of frequencies.

7. The method according to claim 1, wherein each propagation time difference is estimated from a fifth plurality of fitted lines, with one or a sixth plurality of slopes.

8. The method according to claim 1, wherein the relative propagation delay between each of the first plurality of antenna units and said first terminal or each of the second plurality of terminals are determined using the equation:

$$\Theta_{kl}^{(m,n)}(f) - \Theta_{k'l}^{(m',n)}(f) = \phi_{kl}^{(m,n)}(f) - \phi_{k'l}^{(m',n)}(f) + \Delta_{mm'}^{(n)} f,$$

wherein $\Delta_{mm'}^{(n)} = \tau^{(m,n)} - \tau^{(m',n)}$ is an estimate of the time difference between signals from the n'th terminal arriving at antenna units m and m' of the first plurality of antenna units, $\tau^{(m,n)}$ is the time difference induced by the propagation channel between the processing unit and second plurality of antennas of terminal n, $\Theta_{kl}^{(m,n)}(f) - \Theta_{k'l}^{(m',n)}(f)$ is an estimate of phase difference of two channels, and $\phi_{kl}^{(m,n)}(f) - \phi_{k'l}^{(m',n)}(f)$ is the microscopic phase difference.

9. The method according to claim 8, wherein $\Delta_{mm'}^{(n)}$ is approximated by the term:

$$\hat{\Delta}_{mm'}^{(n)} = \underset{\Delta}{\operatorname{argmin}} \sum_{m=1}^{M} \min_{x_m} \sum_{f \in \aleph_m} \left( \left[ \left( \Theta_{kl}^{(m,n)}(f) - \Theta_{k'l}^{(m',n)}(f) \right) - (x_m + \Delta \cdot f) \right]_{\pm \pi} \right)^2.$$

10. The method according to claim 1, further comprising applying the delay profile in the frequency domain by de-rotating the phase of a transmitted signal from the first plurality of antenna units.

11. The method according to claim 10, wherein the delay profile is applied as a pure time shift or in the alternative as a cyclic time shift.

12. The method according to claim 1, further comprising applying the delay profile in the time domain.

13. The method according to claim 1, wherein compensating for the determined relative propagation delay from each antenna unit of the first plurality of antenna units to the first terminal comprises applying the delay profile to the transmission between the processing unit and the first terminal to reduce a frequency selectivity of an effective channel between the first plurality of antenna units and the first terminal.

14. An apparatus in a base station or a NodeB configured to connect to a communication link for establishing communication to a first plurality of antenna units that each wirelessly communicate with at least a first terminal, the first terminal having a terminal antenna, the apparatus comprising a controller unit and a storage unit, the storage unit storing computer software that when executed by the controller unit controls the apparatus to compensate for propagation delay in a wireless communication system based on configuring the apparatus to:

determine a relative propagation delay associated with a wireless channel from each of the first plurality of antenna units to the terminal antenna of said first terminal, the first plurality of antenna units being part of a distributed antenna system such that the first plurality of antenna units are spatially separated from each other and from the base station or the NodeB;

establish a delay profile specific for the first terminal using the determined relative propagation delay; and compensate for the determined relative propagation delay from each of the first plurality of antenna units to said first terminal by applying the delay profile to a transmission between the processing unit and said first terminal, wherein the relative propagation delay between each of the first plurality of antenna units and said first terminal or between each of the first plurality of antenna units and each of a second plurality of terminals are determined in the frequency domain, and wherein the storage unit stores computer software that when executed by the controller unit further controls the apparatus to:

evaluate phase differences between propagation channels between said first terminal and first plurality of antenna units, or between a terminal in the second plurality of terminals and first plurality of antenna units, for two different frequencies; and estimate propagation time differences from the slope of one line being fitted to the evaluated phase differences over frequency.

15. The apparatus according to claim 14, wherein the transmission is from the apparatus to said first terminal or from said first terminal to the apparatus.

16. The apparatus according to claim 14, wherein one of the first plurality of antenna units uses a multitude of antennas.

17. The apparatus according to claim 14, wherein said first terminal uses a plurality of antennas.

18. The apparatus according to claim 14, wherein the apparatus is in communication with a third plurality of terminals.

19. The apparatus according to claim 14, wherein the phase differences are evaluated for a fourth plurality of frequencies.

20. The apparatus according to claim 14, wherein each propagation time difference is estimated from a fifth plurality of fitted lines, with one or a sixth plurality of slopes.

21. The apparatus according to claim 14, wherein the relative propagation delay between each of the first plurality of antenna units and said first terminal or each of the second plurality of terminals are determined using the equation:

$$\Theta_{kl}^{(m,n)}(f) - \Theta_{kT}^{(m',n)}(f) = \phi_{kl}^{(m,n)}(f) - \phi_{kT}^{(m',n)}(f) + \Delta_{mm'}^{(n)} f,$$

wherein $\Delta_{mm'}^{(n)} = \tau^{(m,n)} - \tau^{(m',n)}$ is an estimate of the time difference between signals from the n'th terminal arriving at antenna units m and m' of the first plurality of antenna units, $\tau^{(m,n)}$ is the time difference induced by the propagation channel between the processing unit and second plurality of antennas of terminal n, $\Theta_{kl}^{(m,n)}(f) - \Theta_{kT}^{(m',n)}(f)$ is an estimate of phase difference of two channels, and $\phi_{kl}^{(m,n)}(f) - \phi_{kT}^{(m',n)}(f)$ is the microscopic phase difference.

22. The apparatus according to claim 14, wherein the storage unit stores computer software that when executed by the controller unit controls the apparatus to apply the delay profile in the frequency domain by de-rotating the phase of a transmitted signal from the first plurality of antenna units.

23. The apparatus according to claim 22, wherein the delay profile is applied as a pure time shift or in the alternative as a cyclic time shift.

24. The apparatus according to claim 14, wherein the storage unit stores computer software that when executed by the controller unit controls the apparatus to apply the delay profile in the time domain.

25. The apparatus according to claim 14, wherein the compensation for the determined relative propagation delay from each antenna unit of the first plurality of antenna units to the first terminal comprises the application of the delay profile to the transmission between the processing unit and the first terminal to reduce a frequency selectivity of an effective channel between the first plurality of antenna units and the first terminal.

\* \* \* \* \*